United States Patent Office 3,226,299
Patented Dec. 28, 1965

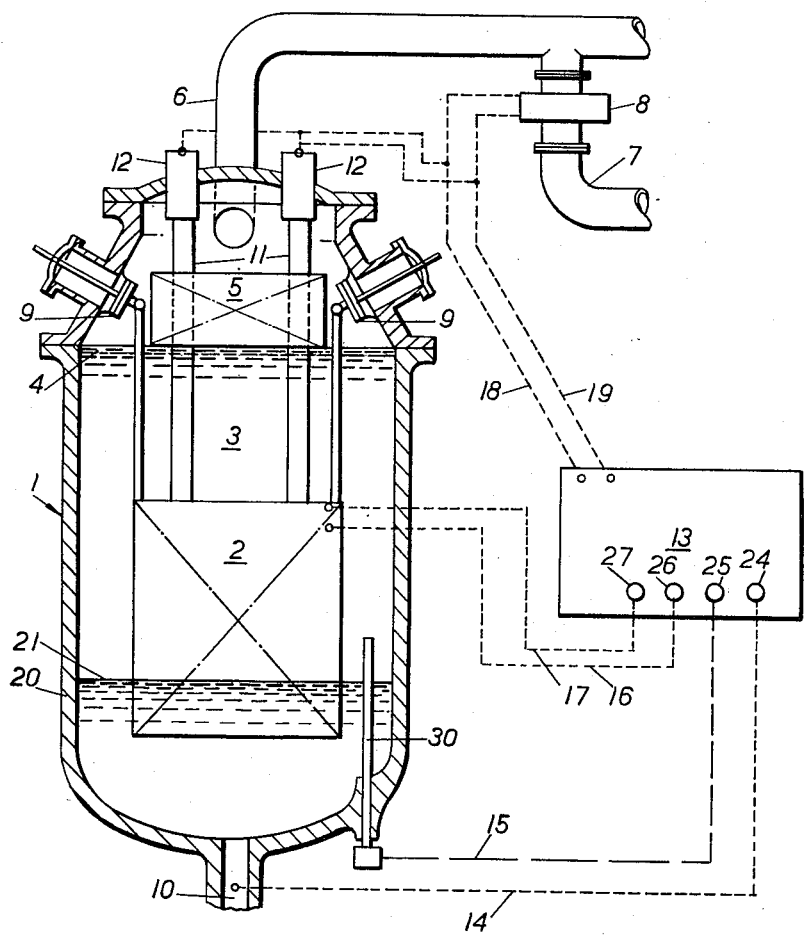

3,226,299
METHOD AND APPARATUS FOR RENDERING SUBCRITICAL A BOILING WATER NUCLEAR REACTOR
Stanley Hackney, Fearnhead, near Warrington, England, assignor to United Kingdom Atomic Energy Authority, London, England
Filed Dec. 10, 1962, Ser. No. 243,564
Claims priority, application Great Britain, Dec. 20, 1961, 45,610/61
2 Claims. (Cl. 176—20)

This invention relates to nuclear reactors.

At the present time it is clear that nuclear power is not competitive with coal or oil derived power for small installations. This is very apparent in the field of nuclear powered ships.

One step in reducing costs is provided by the invention disclosed in my copending application Serial No. 113,734 filed May 31, 1961, now Patent No. 3,184,391 dated May 18, 1965 (which has a corresponding published patent in Belgian Patent No. 611,625), a reduction in capital cost being achieved by the absence of need of an outer containment vessel.

The present invention provides another step in this effort for reduced capital cost in that it provides a reactor installation having simplified shut-down facilities.

The nuclear reactor according to the present invention has a heat producing core including fuel elements and a circulatable fluid heat transfer medium (primary coolant) as an intermediary between the fuel elements and a liquid reactor coolant medium (secondary coolant) and said reactor coolant medium exerts an effect sustaining reactivity by its presence characterised in that means exist for expelling reactor coolant medium to a degree rendering the reactor non-reactive and then arresting the expulsion to leave a pool of reactor coolant medium of a depth such that the fluid heat transfer medium continues in heat exchange relationship with said pool.

The expulsion of the coolant medium can occur in the liquid phase to a perssure storage vessel or in the vapour phase to a low pressure system such as a condenser or possibly to atmosphere. Expulsion of coolant medium in the vapour phase will raise the level of voidage in all the coolant medium and thereby achieve rapid shut down of the reactor even though there may be a large capacity of water in addition to that in the core.

The expulsion of coolant is supported by conventional shut down rods, and in an emergency both will operate together. When this occurs the residual pool of coolant medium should be of a depth to be capable of accepting the "shut-down" heat in the reactor by evaporation if necessary. The depth of the pool of coolant medium can be detected by a conventional device such as a concentric tube type of inductive level recorder.

One example of a reactor embodying the invention will now be described with reference to the accompanying drawing which is a vertical section.

A boiling water nuclear reactor 1 has a heat producing core 2 contained within a pressure vessel 20, the core containing sheathed fuel elements suspended in clusters in tubes (not shown), as disclosed in the aforementioned Patent Application, with a primary water coolant included within each tube and surrounding the fuel elements. Such a primary coolant passes on the heat generated within the elements to a secondary water coolant 3 via the walls of the fuel element tubes. A normal working level of the secondary coolant 3 is situated above the core 2 and so far as is possible to define a level under working conditions is indicated at 4. Steam generated by boiling of coolant 3 is withdrawn via a steam separator 5 out of the pressure vessel 20 by a steam line 6 which supplies the steam on a direct cycle to a conventional steam turbine (not shown). A second steam line 7 leads from the line 6 and is normally isolated from it by a valve 8, the line 7 being a by-pass direct to a dump condenser (not shown). The primary coolant in the fuel tubes is circulated serially through the tubes by diaphragm pumps 9. Secondary coolant is supplied to the reactor 1 by an inlet 10. The level of coolant within the vessel 20 is detected by a concentric tube type of inductive level recorder 30. Shut-off rods 11 are held raised out of the reactor core 2 by respective driving apparatus 12. Control of the reactor is exercised from a control room 13. To the control room are led transmission lines which carry the following information:

(i) Secondary coolant inlet flow via inlet 10 is indicated along line 14 to indicator 24.
(ii) Secondary coolant level according to recorder 30 is indicated along line 15 to indicator 25.
(iii) Reactivity of the reactor as measured by a flux monitor within the core 2 is indicated along line 16 to indicator 26.
(iv) Reactor period as measured by a period meter within the core 2 is indicated along line 17 to indicator 27.

Other information, such as primary coolant flow, is transmitted by other lines (not shown).

Line 18 gives manual control of the shut-off rod driving apparatus 12 and the valve 8. Line 19 is for automatic control of the same items.

In normal operation the shut off rods 11 are raised out of the reactor core 2 and the secondary coolant is maintained at the level 4. The boiling secondary coolant generates steam which passes, via the steam separator 5, out of the pressure vessel by steam line 6 to the turbine. Primary coolant is circulated by diaphragm pumps 9 around the fuel element tubes. When abnormal reactor conditions are indicated, for example loss of primary coolant flow or an unstable reactor period, the reactor may be shut down. This operation may be carried out by visual inspection of indicators 24, 25, 26, 27 and manual operation of line 18. Alternatively or additionally lines 14, 15, 16, 17 can be connected to operate some comparator type automatic control device (not shown) which on receiving an abnormal signal along any line shuts down the reactor automatically by the control line 19. In either case the shut down operation is accomplished by insertion of the shut off rods 11 into the core 2 and expulsion of liquid phase secondary coolant 3 down to a predetermined level 21.

Expulsion of secondary coolant from the operating reactor results from opening valve 8 and so allowing steam to escape to the dump condenser. The resultant pressure change (a drop from that of the reactor shell pressure to a pressure near or at atmospheric) is sufficient to cause boiling of the liquid secondary coolant and hence to induce a considerable increase of the voidage in the body of the coolant 3. Such voidage increase brings down the reactivity of the core, such reactivity change being sufficient either alone or in combination with the action of the inserted shut off rods to shut down the reactor 1. The characteristics of the valve 8 and the volume of secondary coolant in the reactor vessel are such that opening the valve causes a predetermined portion of the liquid phase secondary coolant originally in the pressure vessel to flash into steam so as to ensure that the level of the liquid secondary coolant drops to position 21 from its original level 4. The final level is checked by means of the level recorder 30. At such a level 21 the coolant is no longer of sufficient volume to act as a moderator to maintain core reactivity but it is sufficiently high up the core for the lower ends of the fuel tubes to be dipped in the remaining coolant pool so that heat transfer is maintained between the circulating primary coolant and liquid phase secondary coolant—such heat transfer serving to remove fuel element decay or "shut-down" heat.

I claim:

1. A method of rendering subcritical a boiling water nuclear reactor having pressurized water interposed as an intermediate heat transfer medium between fuel elements and the boiling water reactor coolant subject to a lesser degree of pressurization, said method comprising the steps of releasing reactor coolant pressure to a degree rendering the reactor subcritical and then arresting the pressure release to leave a pool of reactor coolant of a depth such that the heat transfer medium continues in heat exchange relationship with said pool.

2. A nuclear reactor comprising fuel elements, upright tubes containing the fuel elements, said tubes grouping the fuel elements into a core configuration having upper and lower extremities, means to circulate a pressurized water heat transfer fluid internally in the tubes and over the fuel elements therein, a pressure vessel, a water coolant medium contained within said vessel and in which said tubes are submerged for causing boiling of said medium, said medium having for sustaining reactivity of the reactor a first level at least as high as said upper extremities and a second level between said upper and lower extremities which is lower than is necessary to sustain reactivity yet sufficiently high for the liquid coolant medium to remove shut-down heat from the fuel elements through the heat transfer fluid and the tubes, a valve operable at will to expel the coolant medium from the vessel in the vapor phase to enable lowering said medium from the first to the second level, and means to arrest the expulsion when the second level is reached.

References Cited by the Examiner
UNITED STATES PATENTS

| | | | |
|---|---|---|---|
| 2,770,591 | 11/1956 | Wigner et al. | 176—42 |
| 2,936,273 | 5/1960 | Untermyer | 176—36 |
| 2,968,600 | 1/1961 | Allen | 176—20 |

OTHER REFERENCES

Schultz: "Control of Nuclear Reactors and Power Plants," pp. 215–216, Mar. 6, 1961. Publ. by McGraw-Hill.

Proceedings of 2nd Geneva Conference, 1958, vol. 11, pp. 372–374, 377 and 378.

REUBEN EPSTEIN, *Primary Examiner.*

CARL D. QUARFORTH, *Examiner.*

M. R. DINNIN, *Assistant Examiner.*